(12) United States Patent
Koga et al.

(10) Patent No.: US 8,323,612 B2
(45) Date of Patent: *Dec. 4, 2012

(54) LITHIUM MANGANATE FOR NON-AQUEOUS ELECTROLYTE SECONDARY BATTERY, PROCESS FOR PRODUCING THE SAME, AND NON-AQUEOUS ELECTROLYTE SECONDARY BATTERY

(75) Inventors: Kazumichi Koga, Yamaguchi-ken (JP); Masayuki Uegami, Yamaguchi-ken (JP); Kazutoshi Ishizaki, Yamaguchi-ken (JP); Hideaki Sadamura, Yamaguchi-ken (JP)

(73) Assignee: Toda Kogyo Corporation, Otake-shi, Hiroshima-ken (JP)

( * ) Notice: Subject to any disclaimer, the term of this patent is extended or adjusted under 35 U.S.C. 154(b) by 160 days.

This patent is subject to a terminal disclaimer.

(21) Appl. No.: 12/810,367

(22) PCT Filed: Dec. 26, 2008

(86) PCT No.: PCT/JP2008/003989
§ 371 (c)(1),
(2), (4) Date: Aug. 20, 2010

(87) PCT Pub. No.: WO2009/084214
PCT Pub. Date: Jul. 9, 2009

(65) Prior Publication Data
US 2010/0327221 A1 Dec. 30, 2010

(30) Foreign Application Priority Data
Dec. 28, 2007 (JP) ................................. 2007-339431

(51) Int. Cl.
*C01G 45/12* (2006.01)
*C01D 1/02* (2006.01)
*C01G 37/14* (2006.01)
*C01G 23/00* (2006.01)
*C01F 7/00* (2006.01)

(52) U.S. Cl. ............... 423/599; 423/594.15; 423/594.2; 423/594.4; 423/594.6; 423/596; 423/598; 423/600

(58) Field of Classification Search .................. 423/599, 423/594.2, 594.4, 594.6, 596, 598, 600, 594.15, 423/306; 252/182.1; 428/402; 429/523, 429/527, 528
See application file for complete search history.

(56) References Cited

U.S. PATENT DOCUMENTS 5,255,730 A * 10/1993 Wall ............................. 164/100
(Continued)

FOREIGN PATENT DOCUMENTS
JP 09-259863 10/1997
(Continued)

OTHER PUBLICATIONS

International Preliminary Report on Patentability in PCT/JP2008/003989 dated Aug. 19, 2010.
(Continued)

*Primary Examiner* — Colleen Dunn
*Assistant Examiner* — Anthony J Zimmer
(74) *Attorney, Agent, or Firm* — Nixon & Vanderhye P.C.

(57) ABSTRACT

The present invention relates to lithium manganate particles having a primary particle diameter of 1 to 8 µm and forming substantially single-phase particles, which have a composition represented by the following chemical formula:

$$Li_{1+x}Mn_{2-x-y}Y1_yO_4+Y2$$

in which Y1 is at least one element selected from the group consisting of Ni, Co, Mg, Fe, Al, Cr and Ti; Y2 is P and is present in an amount of 0.01 to 0.6 mol % based on Mn; and x and y satisfy $0.03 \leq x \leq 0.15$ and $0.05 \leq y \leq 0.20$, respectively, and
which lithium manganate particles have a specific surface area of the lithium manganate particles of 0.3 to 0.9 m²/g (as measured by BET method); and have an average particle diameter ($D_{50}$) of the lithium manganate particles of 3 to 10 µm. A positive electrode active substance of a lithium ion secondary battery using the lithium manganate particles of the present invention has a high output and is excellent in high-temperature stability.

9 Claims, 2 Drawing Sheets

U.S. PATENT DOCUMENTS

| | | | |
|---|---|---|---|
| 6,461,770 B1 * | 10/2002 | Yoshimura et al. | 429/231.95 |
| 6,692,665 B2 * | 2/2004 | Shima et al. | 252/518.1 |
| 6,814,894 B2 | 11/2004 | Shoji | |
| 2002/0081494 A1 | 6/2002 | Kondo | |
| 2005/0170250 A1 | 8/2005 | Ohzuku | |
| 2006/0269846 A1 * | 11/2006 | Xu et al. | 429/326 |
| 2006/0275664 A1 | 12/2006 | Ohzuku | |
| 2008/0206644 A1 * | 8/2008 | Kanno et al. | 429/224 |

FOREIGN PATENT DOCUMENTS

| | | |
|---|---|---|
| JP | 11-302020 | 11/1999 |
| JP | 2001-146425 | 5/2001 |
| JP | 2002-033099 | 1/2002 |
| JP | 2002-151070 | 5/2002 |
| JP | 2002-316823 | 10/2002 |
| JP | 2003-323893 | 11/2003 |
| JP | 2006-252940 | 9/2006 |

OTHER PUBLICATIONS

International Search Report for PCT/JP2008/003989, mailed Feb. 3, 2009.

* cited by examiner

LITHIUM MANGANATE FOR NON-AQUEOUS ELECTROLYTE SECONDARY BATTERY, PROCESS FOR PRODUCING THE SAME, AND NON-AQUEOUS ELECTROLYTE SECONDARY BATTERY

This application is the U.S. national phase of International Application No. PCT/JP2008/003989, filed 26 Dec. 2008, which claims priority to Japanese Application No. 2007-339431, filed 28 Dec. 2007, the entire contents of each of which are hereby incorporated by reference.

TECHNICAL FIELD

The present invention relates to lithium manganate capable of exhibiting a high output and an excellent high-temperature stability when used as a positive electrode active substance for lithium ion secondary batteries.

BACKGROUND ART

With the recent rapid development of portable and cordless electronic devices such as audio-visual (AV) devices and personal computers, there is an increasing demand for secondary batteries or batteries having a small size, a light weight and a high energy density as a power source for driving these electronic devices. Under these circumstances, lithium ion secondary batteries having advantages such as a high charge/discharge voltage and a large charge/discharge capacity have been noticed.

Hitherto, as positive electrode active substances useful for high energy-type lithium ion secondary batteries exhibiting a 4 V-grade voltage, there are generally known $LiMn_2O_4$ which has a spinel structure, $LiMnO_2$, $LiCoO_2$, $LiCo_{1-x}Ni_xO_2$ and $LiNiO_2$ which have a rock-salt type structure, or the like. Among these positive electrode active substances, $LiCoO_2$ is more excellent because of a high voltage and a high capacity thereof. However, $LiCoO_2$ has the problems such as a high production cost owing to a less supply amount of raw cobalt materials and a poor environmental safety upon disposal of batteries obtained by using the substance. In consequence, there have now been made earnest studies on lithium manganate particles with a spinel type structure (basic composition: $LiMn_2O_2$; this is similarly applied to the subsequent descriptions) which are produced by using, as a raw material, manganese having a large supply amount, a low cost and a good environmental compatibility.

As is known in the art, the lithium manganate particles may be obtained by mixing a manganese compound and a lithium compound at a predetermined mixing ratio and then calcining the resulting mixture in the temperature range of 700 to 800° C.

When using the lithium manganate particles as a positive electrode active substance for lithium ion secondary batteries, the resulting battery has a high voltage and a high energy density, but tends to suffer from the problems such as poor charge/discharge cycle characteristics. The reason therefor is considered to be that when the battery is subjected to repeated charge/discharge cycles, the crystal lattice of the lithium manganate particles used therein is expanded and contracted owing to desorption and insertion behavior of lithium ions in the crystal structure to cause change in volume of the crystal, resulting in occurrence of breakage of the crystal lattice or dissolution of Mn in an electrolyte solution.

At present, in the lithium ion secondary batteries using the lithium manganate particles, it has been strongly required to suppress deterioration in charge/discharge capacity due to repeated charge/discharge cycles, and improve the charge/discharge cycle characteristics, in particular, under high-temperature and low-temperature conditions.

In order to improve the charge/discharge cycle characteristics of the batteries, it is required that the positive electrode active substance used therein which comprise the lithium manganate particles has an excellent packing property and an appropriate size, and further is free from elution of Mn therefrom. To meet the requirements, there have been proposed the method of suitably controlling a particle size and a particle size distribution of the lithium manganate particles; the method of obtaining the lithium manganate particles having a high crystallinity by controlling a calcining temperature thereof; the method of adding different kinds of elements to the lithium manganate particles to strengthen or reduce a bonding force between the crystals; the method of subjecting the lithium manganate particles to surface treatment or adding additives thereto to suppress elution of Mn therefrom; or the like.

Conventionally, it is known that aluminum as one of the different kinds of elements is incorporated in the lithium manganate particles (Patent Documents 1 to 6). In addition, it is known that an anti-sintering agent having a melting point of not higher than 800° C., in particular, phosphorus, a phosphorus oxide or a phosphorus compound, is added to the lithium manganate particles upon calcination of the particles to impart thereto the effect of preventing elution of Mn therefrom. In Patent Documents 7 and 8, there have been respectively described lithium manganate particles having a coating layer for preventing elution of Mn therefrom which is obtained by adding phosphorus to the particles and calcining the resulting mixture in an oxidation atmosphere at a temperature of 650 to 900° C. (Patent Document 7), and lithium manganate to which a boron compound and a phosphorus compound are added to suppress the reaction with an electrolyte solution (Patent Document 8).

More specifically, there are respectively described the method of incorporating a Ca compound and/or an Ni compound as well as an Al compound into lithium manganate particles (Patent Document 1); the method of incorporating Al into lithium manganate particles in which positions of peaks of respective diffraction planes as observed in X-ray diffraction analysis thereof are defined (Patent Document 2); the method of incorporating a different kind of element such as Al into lithium manganate particles and conducting calcination of the lithium manganate particles at multiple separate stages (Patent Document 3); lithium manganate obtained by incorporating Al into lithium manganate particles, which has a specific surface area of 0.5 to 0.8 $m^2$/g and a sodium content of not more than 1000 ppm (Patent Document 4); lithium manganate obtained by incorporating a different kind of element such as Al into lithium manganate particles which comprises crystal particles having a half value width of (400) plane of not more than 0.22° and an average particle diameter of not more than 2 μm (Patent Document 5); lithium manganate obtained by incorporating a different kind of element such as Al into lithium manganate particles which comprises crystal particles having a crystallite size of not less than 600 Å and a lattice distortion of not more than 0.1% (Patent Document 6); lithium manganate obtained by adding phosphorus to raw particles and calcining the resulting mixture in an oxidation atmosphere at a temperature of 650 to 900° C. (Patent Document 7); and lithium manganate to which a boron compound and a phosphorus compound are added to suppress the reaction with an electrolyte solution (Patent Document 8).

Patent Document 1: Japanese Patent Application Laid-Open (KOKAI) No. 2000-294237
Patent Document 2: Japanese Patent Application Laid-Open (KOKAI) No. 2001-146425
Patent Document 3: Japanese Patent Application Laid-Open (KOKAI) No. 2001-328814
Patent Document 4: Japanese Patent Application Laid-Open (KOKAI) No. 2002-33099
Patent Document 5: Japanese Patent Application Laid-Open (KOKAI) No. 2002-316823
Patent Document 6: Japanese Patent Application Laid-Open (KOKAI) No. 2006-252940
Patent Document 7: Japanese Patent Application Laid-Open (KOKAI) No. 9-259863
Patent Document 8: Japanese Patent Application Laid-Open (KOKAI) No. 2001-52698

DISCLOSURE OF THE INVENTION

Problem to be Solved by the Invention

At present, it has been strongly required to provide lithium manganate as a positive electrode active substance for a non-aqueous electrolyte secondary battery which is improved in output characteristics and high-temperature characteristics. However, the lithium manganate capable of fully satisfying these requirements has not been obtained until now.

That is, in the above Patent Documents 1 to 8, there are respectively described lithium manganates in which a part of manganese as a constituting metal element thereof is substituted with a different kind of element, or lithium manganates incorporated with a small amount of a phosphorus compound. However, these lithium manganates have failed to provide batteries capable of exhibiting satisfactory high-temperature storage characteristics and, therefore, tend to be insufficient for practical use.

In addition, these conventional materials also have failed to exhibit a level enough to satisfy the high-temperature storage characteristics although they are improved only in crystallinity thereof and, therefore, tend to be insufficient for practical use.

Means for Solving the Problem

The above problems and technical tasks can be solved and accomplished by the following aspects of the present invention.

That is, according to the present invention, there are provided lithium manganate particles having a primary particle diameter of 1 to 8 μm and forming substantially single-phase particles, which have a composition represented by the following chemical formula:

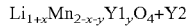

in which Y1 is at least one element selected from the group consisting of Ni, Co, Mg, Fe, Al, Cr and Ti; Y2 is P and is present in an amount of 0.01 to 0.6 mol % based on Mn; and x and y satisfy $0.03 \leq x \leq 0.15$ and $0.05 \leq y \leq 0.20$, respectively, and which lithium manganate particles have a specific surface area of the lithium manganate particles of 0.3 to 0.9 m²/g (as measured by BET method); and an average particle diameter ($D_{50}$) of the lithium manganate particles of 3 to 10 μm (Invention 1).

Also, according to the present invention, there are provided the lithium manganate particles as described in the above Invention 1, wherein an X-ray diffraction intensity ratio of I(400)/I(111) of the lithium manganate particles is 30 to 50%, and an X-ray diffraction intensity ratio of I(440)/I(111) of the lithium manganate particles 15 to 25% (Invention 2).

Also, according to the present invention, there are provided the lithium manganate particles as described in the above Invention 1 or 2, wherein when a non-aqueous electrolyte secondary battery of a CR 2032 type comprising the lithium manganate particles which are used as a whole or a part of a positive electrode active substance, a non-aqueous electrolyte solution (a mixed solution comprising EC and DEC at a mixing ratio of 3:7) to which $LiPF_6$ is added in an amount of 1 mol/L, and a 500 μm-thick Li foil as a negative electrode, is subjected to measurement of charge/discharge capacities, an initial discharge capacity of the battery is 90 to 115 mAh/g (Invention 3).

Also, according to the present invention, there are provided the lithium manganate particles as described in any one of the above Inventions 1 to 3, wherein when a non-aqueous electrolyte secondary battery of a CR 2032 type comprising the lithium manganate particles which are used as a whole or a part of a positive electrode active substance, a non-aqueous electrolyte solution (a mixed solution comprising EC and DEC at a mixing ratio of 3:7) to which $LiPF_6$ is added in an amount of 1 mol/L, and a 500 μm-thick Li foil as a negative electrode, is subjected to measurement of charge/discharge capacities in which the battery is charged and discharged at a rate of 0.1 C to measure a discharge capacity (a) thereof, charged at a rate of 0.1 C until reaching 4.5 V and discharged until reaching a discharge depth of 70%, allowed to stand at 60° C. for one week, discharged until reaching 3.0 V, and then subjected to a charge/discharge test for one cycle at a rate of 0.1 C to measure a discharge capacity (b) thereof, a capacity recovery rate (b/a (%)) of the battery is not less than 95% (Invention 4).

In addition, according to the present invention, there is provided a process for producing the lithium manganate particles as described in any one of the above Inventions 1 to 4, comprising the steps of:

mixing lithium carbonate, manganese oxide coated with a compound of at least one element selected from the group consisting of Ni, Co, Mg, Fe, Al, Cr and Ti, and a phosphorus compound having a melting point of not higher than 800° C. with each other; and calcining the resulting mixture at a temperature of 800 to 1050° C. (Invention 5).

Also, according to the present invention, there is provided the process for producing the lithium manganate particles as described in the above Invention 5, wherein the manganese oxide coated with the compound of at least one element selected from the group consisting of Ni, Co, Mg, Fe, Al, Cr and Ti is obtained by adding an aqueous solution comprising a salt of at least one element selected from the group consisting of Ni, Co, Mg, Fe, Al, Cr and Ti to a water suspension comprising manganese oxide to adjust a pH value of the water suspension and thereby form a coat of the compound of at least one element selected from the group consisting of Ni, Co, Mg, Fe, Al, Cr and Ti on a surface of respective particles of the manganese oxide (Invention 6).

Also, according to the present invention, there is provided the process for producing the lithium manganate particles as described in the above Invention 6, wherein the coat of the compound of at least one element selected from the group consisting of Ni, Co, Mg, Fe, Al, Cr and Ti which is formed on the surface of respective particles of the manganese oxide is non-crystalline as analyzed by X-ray diffraction (Invention 7).

Also, according to the present invention, there is provided the process for producing the lithium manganate particles as described in the above Invention 6 or 7, wherein the manganese oxide is substantially in the form of a single crystal (Invention 8).

Also, according to the present invention, there is provided the process for producing the lithium manganate particles as described in any one of the above Inventions 5 to 8, wherein the manganese oxide has an average particle diameter of not less than 1 µm (Invention 9).

Further, according to the present invention, there is provided a non-aqueous electrolyte secondary battery comprising a positive electrode active substance a part or a whole of which is formed from the lithium manganate particles as described in any one of the above Inventions 1 to 4 (Invention 10).

Effect of the Invention

The lithium manganate particles according to the present invention exhibit a high output power and, in particular, are excellent in high-temperature stability, and, therefore, can be suitably used as a positive electrode active substance for a non-aqueous electrolyte secondary battery.

In addition, it is considered that when adding a phosphorus compound having a melting point of not higher than 800° C. to manganese oxide, in particular, adding a small amount of ammonium dihydrogen phosphate ($NH_4H_2PO_4$) to $Mn_3O_4$, mixing the obtained mixture with lithium carbonate, and then calcining the resulting composition at a predetermined temperature, the obtained $Mn_3O_4$ surface layer becomes weakly acidic so that it is likely to selectively produce an $Li_3PO_4$ layer as a coating layer which serves for preventing elution of Mn from the particles. As a result, it is possible to obtain lithium manganate particles having excellent properties.

PREFERRED EMBODIMENT FOR CARRYING OUT THE INVENTION

Figure 1:
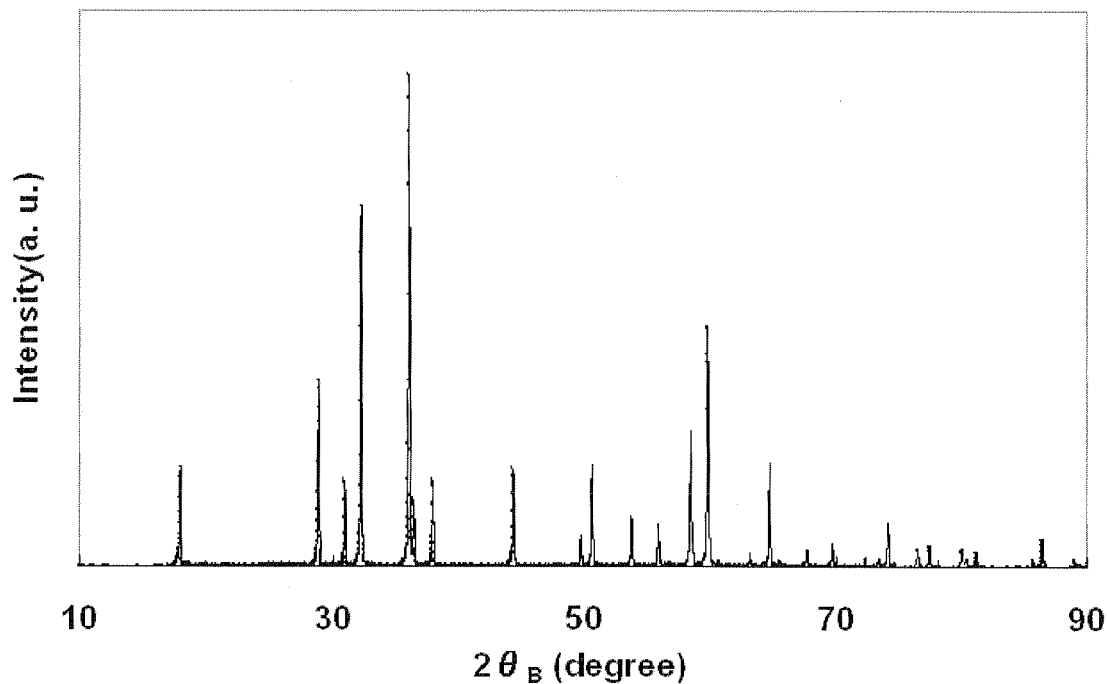
FIG. 1 is an X-ray diffraction pattern of the manganese oxide obtained in Example 1 before being treated with Al.

The present invention is described in detail below.

First, the lithium manganate particles for a non-aqueous electrolyte secondary battery according to the present invention are described.

The lithium manganate particles according to the present invention comprise at least one metal element (Y1) selected from the group consisting of Ni, Co, Mg, Fe, Al, Cr and Ti. The Y1 element is preferably uniformly present within the respective lithium manganate particles without being localized on a surface of the respective particles. In addition, the lithium manganate particles have such a crystal structure in which the (400) and (440) planes are less grown relative to the (111) plane.

The lithium manganate particles according to the present invention have a composition represented by the following chemical formula:

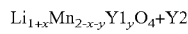

$Li_{1+x}Mn_{2-x-y}Y1_yO_4+Y2$ in which Y1 is at least one element selected from the group consisting of Ni, Co, Mg, Fe, Al, Cr and Ti, and Y2 is phosphorus (P) constituting a phosphorus compound having a melting point of not higher than 800° C.

In the above chemical formula, x is a number of 0.03 to 0.15, and y is a number of 0.05 to 0.20. When x is less than 0.03, the resulting particles have a high capacity, but tends to be considerably deteriorated in high-temperature characteristics. When x is more than 0.15, the resulting particles exhibit improved high-temperature characteristics, but tend to be considerably deteriorated in capacity or tend to cause increase in resistance owing to formation of Li-rich phase therein. The value of x is preferably 0.05 to 0.15.

When y is less than 0.05, it may be difficult to attain a sufficient effect of addition of the Y1 element. When y is more than 0.20, the resulting particles tend to suffer from large decrease in capacity and, therefore, tend to be unpractical. The value of y is preferably 0.05 to 0.15.

The content of Y2 is 0.01 to 0.6 mol % based on Mn. When the content of Y2 based on Mn is less than 0.01 mol %, the Y2 element added may fail to exhibit a sufficient anti-sintering effect. When the content of Y2 based on Mn is more than 0.6 mol %, the thickness of a coating layer formed of the phosphorus compound tends to be too large, resulting in formation of a resistance component. The content of Y2 based on Mn is preferably 0.02 to 0.40 mol %, more preferably 0.02 to 0.20 mol % and still more preferably 0.02 to 0.15 mol %.

In the lithium manganate particles according to the present invention, the Y1 element (i.e., at least one element selected from the group consisting of Ni, Co, Mg, Fe, Al, Cr and Ti) is preferably uniformly dispersed within the particles. When the Y1 element is localized in the respective particles, the secondary battery obtained by using the resulting lithium manganate particles tends to be deteriorated in stability.

The Y2 element is preferably present in the vicinity of the surface of the respective particles to form a compound with Li by selectively bonding to Li, more preferably, to form a uniform coating film thereon. If the Y2 element is also present within the lithium manganate particles, the secondary battery obtained by using the resulting lithium manganate particles tends to be deteriorated in stability.

The lithium manganate particles according to the present invention preferably have an average primary particle diameter of 1 to 8 µm. When the average primary particle diameter of the lithium manganate particles is less than 1 µm, the secondary battery obtained by using the resulting lithium manganate particles tends to be deteriorated in stability. When the average primary particle diameter of the lithium manganate particles is more than 8 µm, the secondary battery obtained by using the resulting lithium manganate particles tends to be deteriorated in output. The average primary particle diameter of the lithium manganate particles is more preferably 2 to 7.5 µm and still more preferably 3 to 6 µm.

The BET specific surface area of the lithium manganate particles according to the present invention is in the range of 0.3 to 0.9 $m^2/g$. When the BET specific surface area of the lithium manganate particles is less than 0.3 $m^2/g$, the particles tend to be strongly agglomerated together, thereby failing to attain the effects of the present invention. When the BET specific surface area of the lithium manganate particles is more than 0.9 $m^2/g$, the secondary battery obtained by using the resulting lithium manganate particles tends to be deteriorated in stability. The BET specific surface area of the lithium manganate particles is preferably 0.4 to 0.8 $m^2/g$ and more preferably 0.5 to 0.8 $m^2/g$.

The lithium manganate particles according to the present invention have an average particle diameter (D50; secondary particle diameter) of 3 to 10 μm as measured by using a particle size distribution meter. When the average particle diameter (D50) of the lithium manganate particles is less than 3 μm, the secondary battery obtained by using the resulting lithium manganate particles tends to be deteriorated in stability. When the average particle diameter (D50) of the lithium manganate particles is more than 10 μm, the secondary battery obtained by using the resulting lithium manganate particles tends to be deteriorated in output. The average particle diameter (D50) of the lithium manganate particles is preferably 4.5 to 8 μm and more preferably 5 to 7.5 μm.

When subjecting the lithium manganate particles according to the present invention to X-ray diffraction analysis, a peak intensity ratio of I(400)/I(111) thereof is preferably 30 to 50%, and a peak intensity ratio of I(440)/I(111) thereof is preferably 15 to 25%.

When the respective peak intensity ratios of I(400)/I(111) and I(440)/I(111) are out of the above-specified ranges, the obtained particles tend to be deteriorated in anti-sintering effect and particle growth preventing effect by addition of the phosphorus compound. The peak intensity ratio of I(400)/I(111) is preferably 30 to 35%, and the peak intensity ratio of I(440)/I(111) is preferably 15 to 20%.

The lithium manganate particles according to the present invention preferably have a lattice constant of 0.818 to 0.821 nm. When the lattice constant is less than 0.818 nm, the obtained particles tend to cause deterioration in capacity. When the lattice constant is more than 0.821 nm, the obtained particles tend to cause deterioration in stability. The lattice constant of the lithium manganate particles is more preferably 0.819 to 0.821 nm.

The lithium manganate particles according to the present invention are constituted substantially from a single phase. When the lithium manganate particles are constituted from polycrystals, a large number of lattice-unconformity planes acting as a resistance component upon desorption and insertion of lithium tend to be present in the crystals, so that it may be difficult to allow the resulting battery to generate a sufficient output.

Next, the process for producing the lithium manganate particles according to the present invention is described.

The lithium manganate particles according to the present invention can be obtained by using trimanganese tetraoxide ($Mn_3O_4$) constituted substantially from a single phase as a manganese precursor, and by conducting the steps of treating the manganese precursor in an aqueous solution to coat the surface of the manganese oxide with a compound of at least one element selected from the group consisting of Ni, Co, Mg, Fe, Al, Cr and Ti in the form of very fine particles having a low crystallinity (it means such a condition that the addition of even 10 mol % of the compound is not detectable by X-ray diffraction), mixing the thus surface-treated manganese oxide, lithium carbonate and an anti-sintering agent having a melting point of not higher than 800° C. with each other, and then calcining the resulting mixture at a temperature of not lower than 800° C. and preferably 850 to 1050° C.

The manganese oxide used in the present invention is preferably trimanganese tetraoxide ($Mn_3O_4$). The trimanganese tetraoxide ($Mn_3O_4$) used in the present invention preferably has an average particle diameter (D50) of 2 to 8 μm, a primary particle diameter of 1 to 8 μm and a BET specific surface area of 0.5 to 15 $m^2$/g.

In the case where the manganese precursor having a good crystallinity is used, the reactivity of the manganese precursor with the surface-coating compound such as an Al compound tends to be lowered. As a result, even when using the Al compound having a submicron size, it may be difficult to obtain the reaction product in the form of a uniform solid solution. Therefore, it is necessary to uniformly mix the aluminum compound or the like which is very fine and low-crystalline to such an extent as to be undetectable by X-ray diffraction, with the manganese precursor.

In order to allow the surface-coating material (such as an aluminum compound) to be present in the above condition, a suspension of the manganese precursor may be mixed with an ionic aqueous solution of aluminum to form a uniformly mixed condition of the manganese precursor and aluminum ions, and then a pH value of the resulting mixture may be suitably adjusted, thereby producing the condition in which the very fine and low-crystalline hydroxide is uniformly mixed with the manganese precursor.

As to the reaction conditions, in the case where the manganese precursor is coated with the aluminum compound, the pH value of the reaction solution is controlled to 6 to 10, and the reaction temperature is controlled to 10 to 90° C.

Also, for example, in the case where the manganese precursor is coated with Mg, the pH value of the reaction solution is controlled to 9 to 11, and the reaction temperature is controlled to 10 to 90° C. In the case where the manganese precursor is coated with Co, the pH value of the reaction solution is preferably controlled to 7 to 10, and the reaction temperature is preferably controlled to 10 to 90° C. In the case where the manganese precursor is coated with Ni, the pH value of the reaction solution is preferably controlled to 9 to 11, and the reaction temperature is preferably controlled to 10 to 90° C. In the case where the manganese precursor is coated with Fe, the pH value of the reaction solution is preferably controlled to 9 to 11, and the reaction temperature is preferably controlled to 10 to 90° C. In the case where the manganese precursor is coated with Cr, the pH value of the reaction solution is preferably controlled to 6 to 10, and the reaction temperature is preferably controlled to 10 to 90° C. In the case where the manganese precursor is coated with Ti the pH value of the reaction solution is preferably controlled to 6 to 10, and the reaction temperature is preferably controlled to 10 to 90° C.

In the present invention, an anti-sintering agent having a melting point of not higher than 800° C. is added together with lithium carbonate to the thus surface-coated manganese oxide, followed by calcining the resulting mixture. The anti-sintering agent having a melting point of not higher than 800° C. is preferably a phosphorus compound. Examples of the phosphorus compound include ammonium dihydrogen phosphate, sodium hexametaphosphate and phosphoric acid. In the present invention, among these phosphorus compounds, ammonium dihydrogen phosphate is especially preferably used.

The phosphorus compound may be added in an amount of 0.01 to 0.6 mol % in terms of P based on Mn. When the amount of the phosphorus compound added is less than 0.01 mol % based on Mn, a sufficient anti-sintering effect tends to be attained. When the amount of the phosphorus compound added is more than 0.6 mol % based on Mn, the phosphorus compound component formed on the particles tends to undergo excessive growth, resulting in formation of a resistance component. The amount of the phosphorus compound added is preferably 0.02 to 0.4 mol % and more preferably 0.02 to 0.2 mol %.

Upon the calcination, the phosphorus thus added acts as an anti-sintering agent and has the effect of suppressing growth of the lithium manganate particles. Further, the phosphorus has the effect of increasing such a possibility that the lithium manganate particles are individually and singly present without fusion between the particles. In the conventional lithium manganate particles, it is considered that manganese is eluted out from portions of the particles where the respective particles are weakly bonded (weakly fused) to each other, resulting in deterioration in characteristics of the battery obtained by using the particles, in particular, high-temperature characteristics of the battery. On the other hand, in the present invention, it is considered that since the respective lithium manganate particles are allowed to be present individually and singly to minimize the number of portions where the respective particles are weakly bonded to each other, it is possible to reduce the number of portions of the respective particles from which manganese tends to be eluted out, so that the resulting secondary battery can be enhanced in stability.

It is considered that the above phosphorus compound has a function as a cushioning material for suppressing aggregation between the lithium manganate particles. Also, it is considered that when the aggregation between the primary particles is thus suppressed, the average secondary particle diameter (D50) of the lithium manganate particles can be effectively reduced (from the SEM image shown in FIG. 3, it was confirmed that the primary particles were less aggregated together).

In addition, it is considered that upon the calcination, the phosphorus compound is reacted with lithium contained in the lithium carbonate to form a P—Li-based compound (such as $Li_3PO_4$). It is also considered that $Li_3PO_4$ is produced upon decomposition of the phosphorus compound added, and the respective lithium manganate particles are coated therewith. Further, it is considered that $Li_3PO_4$ has the effect of preventing sintering between the particles, and a thin film of $Li_3PO_4$ has a function as a kind of a protective film for preventing elution of Mn, thereby inhibiting manganese from being eluted out from the particles.

Further, since the respective lithium manganate particles to which phosphorus is added have an edge-dulled octahedral particle shape after being calcined, it is considered that the phosphorus has the effect of dulling an edge of the respective lithium manganate particles. It is considered that the elution of Mn is likely to occur from a ridge (edge) of the octahedral shape of lithium manganate. Therefore, it is considered that when the edge is dulled according to the present invention, it is possible to prevent the elution of Mn from the lithium manganate particles (such a condition that the edge of the respective particles is dulled can be confirmed from the SEM image shown in FIG. 3).

In order to allow the $Li_3PO_4$ to exhibit the anti-sintering effect and the effect of preventing elution of Mn as described above, the addition of $NH_4H_2PO_4$ is considered to be more effective. It is considered that $NH_4H_2PO_4$ thus added has such a function that $NH_3$ is discharged therefrom upon the calcination to thereby temporarily render the surface of the mother material weakly acidic. In the weakly-acidic condition, it is considered that the bonding between phosphorus and Li is promoted, so that an $Li_3PO_4$ layer in the form of a uniform thin film is formed on the respective particles.

In the present invention, by adding phosphorus to the lithium manganate particles, the particles are prevented from being aggregated together, and the ridge (edge) of the octahedral shape of the respective particles is dulled, and further the crystal structure of the individual particles is strengthened by the substitution with the different kind of metal.

In the present invention, it is required to conduct the calcination at a temperature of not lower than 800° C. When the calcination temperature is lower than 800° C., it may be difficult to attain the condition in which the Y1 element such as aluminum is uniformly distributed within the respective particles.

In the above Patent Document 2 (Japanese Patent Application Laid-Open (KOKAI) No. 2001-146425), the homogeneously dispersed condition of Al has been examined by observing the appearance of the respective particles by EPMA analysis. Such a result will be obtained even when Al is localized only on the surface of the respective particles. However, in the localized condition, when actually measuring an output of the battery, there tend to occur the problems such as excessively large resistance which will cause difficulty in generating a suitable electric current. The above calcination is preferably carried out in the temperature range of 850 to 1050° C.

Next, the positive electrode using the positive electrode active substance comprising the lithium manganate particles for a non-aqueous electrolyte secondary battery according to the present invention is described.

When producing the positive electrode using the positive electrode active substance according to the present invention, a conducting agent and a binder are added to and mixed with the positive electrode active substance by an ordinary method. Examples of the suitable conducting agent include acetylene black, carbon black and graphite. Examples of the suitable binder include polytetrafluoroethylene and polyvinylidene fluoride.

The secondary battery produced by using the positive electrode active substance according to the present invention comprises the above positive electrode, a negative electrode and an electrolyte.

Examples of a negative electrode active substance which may be used in the negative electrode include metallic lithium, lithium/aluminum alloy, lithium/tin alloy, and graphite or black lead.

Also, as a solvent for the electrolyte solution, there may be used combination of ethylene carbonate and diethyl carbonate, as well as an organic solvent comprising at least one compound selected from the group consisting of carbonates such as propylene carbonate and dimethyl carbonate, and ethers such as dimethoxyethane.

Further, as the electrolyte, there may be used a solution prepared by dissolving, in addition to lithium phosphate hexafluoride, at least one lithium salt selected from the group consisting of lithium perchlorate and lithium borate tetrafluoride in the above solvent.

The secondary battery produced by using the positive electrode active substance according to the present invention has an initial discharge capacity of 90 to 115 mAh/g.

In the positive electrode produced by using the lithium manganate particles according to the present invention, when the discharge capacity thereof is less than 90 mAh/g, the resulting battery tends to exhibit a low capacity and, therefore, tends to be unpractical. When the discharge capacity of the positive electrode is more than 115 mAh/g, it may be difficult to ensure a sufficient stability of the resulting battery. The discharge capacity of the positive electrode is preferably 95 to 112 mAh/g and more preferably 100 to 110 mAh/g.

In addition, the capacity recovery rate of the battery as one of high-temperature storage characteristics thereof is determined as follows. That is, after the initial discharge capacity (a) of the battery is measured, the battery is charged at a rate of 0.1 C until reaching 4.5 V and then discharged until reaching a discharge depth of 70%. Successively, the battery is allowed to stand at 60° C. for one week and then discharged at a rate of 0.1 C until reaching 3.0 V. Further, the battery is subjected to charging/discharging operation for one more cycle at a rate of 0.1 C to measure a discharge capacity (b) thereof. The capacity recovery rate is calculated from the formula: 100×b/a.

The capacity recovery rate as measured by the above evaluation method is preferably not less than 95%. When the capacity recovery rate is less than 95%, the battery tends to fail to exhibit excellent high-temperature characteristics. The capacity recovery rate is more preferably not less than 98%.

<Function>

In the present invention, by coating the surface of the respective manganese oxide particles with a coating material such as a very fine and low-crystalline aluminum compound to ensure a homogeneously mixed condition thereof, adding ammonium dihydrogen phosphate to the thus surface-coated particles, and calcining the resulting mixture at a temperature as high as not lower than 850° C., it is possible to obtain the lithium manganate having the above excellent characteristics.

As a result, it is considered that the secondary battery using the lithium manganate particles according to the present invention can be improved in both output characteristics and the effect of preventing elution of Mn therefrom at the same time.

EXAMPLES

The present invention is described in more detail by typical examples below.

The average particle diameter ($D_{50}$) of the particles is a volume-based average particle diameter as measured by a wet laser method using a laser type particle size distribution measuring apparatus "MICROTRACK HRA" manufactured by Nikkiso Co., Ltd.

The average primary particle diameter of the particles is expressed by an average value of diameters read out from a SEM image thereof.

The condition of presence of the particles which are allowed to be coated or present on particles was observed and determined using a scanning electron microscope "SEM-EDX" equipped with an energy disperse type X-ray analyzer (manufactured by Hitachi High-Technologies Corp.).

The average primary particle diameter of the particles which are allowed to be coated or present on particles was observed and determined using a scanning electron microscope "SEM-EDX" equipped with an energy disperse type X-ray analyzer (manufactured by Hitachi High-Technologies Corp.).

The X-ray diffraction of the sample was measured using an X-ray diffraction analyzer "RAD-IIA" manufactured by Rigaku Co., Ltd.

The lattice constant of crystals of the particles was calculated from the results of the above powder X-ray diffraction by a Rietveld method.

Whether the crystal structure was a single crystal or not was confirmed by observing an oriented plane of a section of the particles by EBSD.

The coin cell of a CR2032 type produced by the following method using the lithium manganate particles was evaluated for initial charge/discharge characteristics and high-temperature storage characteristics.

First, 92% by weight of an Li—Mn composite oxide as a positive electrode active substance, 2.5% by weight of acetylene black and 2.5% by weight of a graphite "KS-16" both serving as a conducting material, and 3% by weight of polyvinylidene fluoride dissolved in N-methylpyrrolidone as a binder, were mixed with each other, and the resulting mixture was applied onto an Al metal foil and then dried at 120° C. The thus obtained sheets were each blanked into 16 mmϕ and then compression-bonded together under a pressure of 1.5 t/cm², thereby producing an electrode having a thickness of 50 μm and using the thus produced electrode as a positive electrode. A sheet of metallic lithium blanked into 16 mmϕ was used as a negative electrode, and a solution prepared by mixing EC and DEC with each other at a volume ratio of 3:7 in which 1 mol/L of $LiPF_6$ was dissolved, was used as an electrolyte solution, thereby producing a coin cell of a CR2032 type.

The initial charge/discharge characteristics of the cell were determined as follows. That is, under a room temperature condition, the cell was charged at a current density of 0.1 C until reaching 4.5 V, and discharged at a current density of 0.1 C until reaching 3.0 V to measure an initial discharge capacity of the cell.

Example 1

Production of Lithium Manganate Particles

Under a nitrogen gas flow, 0.5 mol of manganese sulfate was added to 3.5 mol of sodium hydroxide to prepare a reaction solution having a total volume of 1 L. Manganese hydroxide thus produced was aged at 90° C. for 1 hr. After completion of the aging, air was passed through the reaction solution to oxidize manganese hydroxide at 90° C., and the obtained reaction product was washed with water and then dried, thereby obtaining manganese oxide particles.

The thus obtained manganese oxide particles were $Mn_3O_4$ and had a granular shape, an average particle diameter of 4.8 μm and a BET specific surface area of 0.6 m²/g.

The resulting water suspension comprising the manganese oxide particles was washed with water in an amount of 5 times the amount of the water suspension using a filter press, and further subjected to deaggregation to adjust a concentration of the manganese oxide particles in the suspension to 10% by weight. A 0.2 mol/L sodium aluminate aqueous solution was continuously fed to the suspension in a reaction vessel such that a molar ratio of Mn:Al in the resulting mixture was 95:5. The contents of the reaction vessel were always kept stirred by a stirrer and, at the same time, a 0.2 mol/L sulfuric acid aqueous solution was automatically supplied thereto so as to control the pH of the reaction solution in the reaction vessel to 8±0.5, thereby obtaining a suspension comprising the manganese oxide particles whose surface was coated with aluminum hydroxide.

The resulting suspension was washed with water in an amount of 10 times the weight of the manganese oxide particles in the suspension using a filter press, and then dried, thereby obtaining the manganese oxide particles coated with aluminum hydroxide which had a molar ratio of Mn:Al of 95:5 and an average secondary particle diameter of 4.8 μm.

Figure 2:
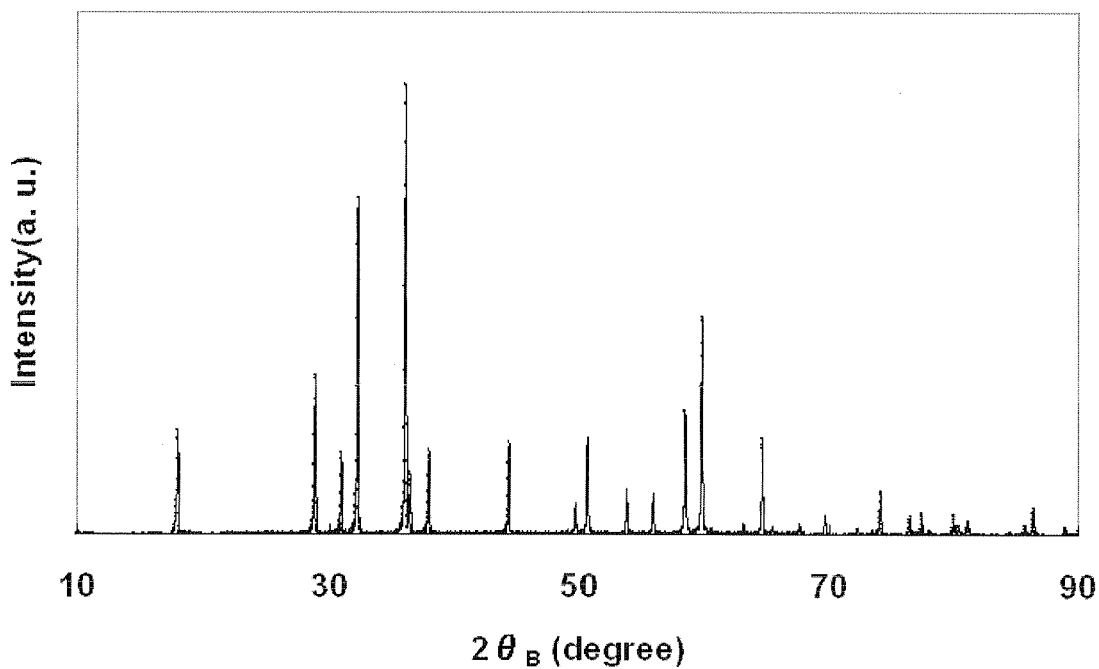
FIG. 2 is an X-ray diffraction pattern of the manganese oxide after being treated with Al.

The X-ray diffraction pattern of the manganese oxide before being treated with aluminum is shown in FIG. 1, and the X-ray diffraction pattern of the manganese oxide after being treated with aluminum is shown in FIG. 2. In FIG. 2, no peak attributed to the Al compound was observed. As a result, it was confirmed that the Al compound was present in the form of very fine low-crystalline particles.

Figure 3:
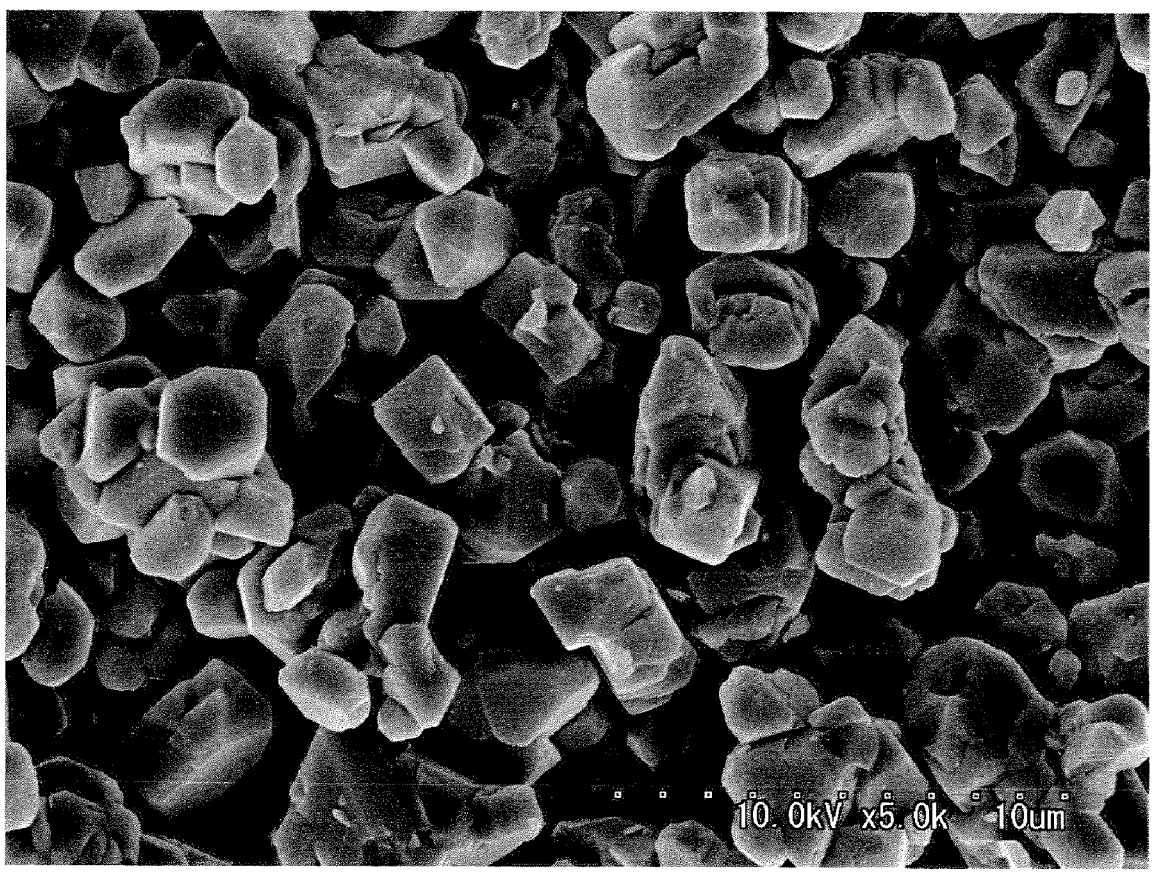
FIG. 3 is a SEM image of the lithium manganate particles obtained in Example 1.

The resulting $Mn_3O_4$ particles coated with aluminum hydroxide were dry-mixed with lithium carbonate and ammonium dihydrogen phosphate which was weighed such that the content of phosphorus in the ammonium dihydrogen phosphate was 0.2 mol % based on Mn, for 1 hr at a proportion of Li:Mn:Al=1.072:1.828:0.10, thereby obtaining a uniform mixture. Thirty grams of the thus obtained mixture was placed in an aluminum crucible, and held therein in atmospheric air at 960° C. for 3 hr, thereby obtaining lithium manganate particles. As a result of subjecting the resulting particles to X-ray diffraction analysis, it was confirmed that any peak attributed to the phosphorus and the phosphorus compound added was not detected, and the lithium manganate particles were therefore constituted from only a single phase. An SEM image of the thus obtained lithium manganate particles is shown in FIG. 3. As shown in FIG. 3, there was observed the condition that the obtained particles were less aggregated together.

It was confirmed that the thus obtained lithium manganate particles had a composition: $Li_{1+x}Mn_{2-x-y}Y_yO_4$ in which x is 0.113 and y is 0.10; the content of phosphorus (P) in the lithium manganate particles was 0.2 mol % based on Mn; the average primary particle diameter of the lithium manganate particles was 5 µm; the average particle diameter ($D_{50}$) of secondary particles (behavior particles) of the lithium manganate particles was 5.9 µm; the BET specific surface area value of the lithium manganate particles was 0.69 m²/g; and the lattice constant of crystals of the lithium manganate particles was 0.8199 nm.

A 200 mL beaker was charged with 5 g of the thus obtained lithium manganate particles and 100 mL of pure water. The contents of the beaker were boiled for 7 min and then cooled, and further filtered through a filter paper No. 5B. The thus separated filtrate solution was subjected to a solubility test to identify constitutional elements of the particles by ICP. As a result, a constant amount of Li was dissolved in the solution irrespective of the amount of phosphorus added. From the above results, it was considered that the phosphorus was present in a larger amount on the surface of the respective lithium manganate particles. In consequence, it was confirmed that there was a high possibility that the material being present on the surface of the respective particles was $AlPO_3$ or $Li_3PO_4$.

The coin cell produced by using a positive electrode active substance comprising the thus obtained lithium manganate particles had an initial discharge capacity of 106 mAh/g and a charge/discharge efficiency of 98%. Thereafter, the cell was subjected to measurement of a capacity recovery rate thereof. As a result, it was confirmed that the capacity recovery rate of the cell was 98%.

The lithium manganate particles obtained in Example 1 were kneaded with a resin, and the particles in the thus obtained kneaded material were cut using a cross-section polisher. From the EPMA mapping of Mn and Al on a section of each of the thus cut particles, it was confirmed that Al was uniformly distributed on the section of each particle similarly to Mn.

Examples 2 to 5

The same procedure as defined in Example 1 was conducted except that the kind of manganese oxide used, the kind of Y1, the amount of Y2 and the calcination conditions were changed variously, thereby obtaining lithium manganate particles.

The production conditions used above are shown in Table 1, and various properties of the thus obtained lithium manganate particles are shown in Table 2.

Comparative Example 1

Manganese oxide ($MnO_2$; average particle diameter: 15 µm), aluminum hydroxide ($Al(OH)_3$) and lithium carbonate were mixed with each other, and then calcined at 960° C., thereby obtaining lithium manganate particles.

Comparative Example 3

Manganese oxide ($Mn_3O_4$; average particle diameter: 4 µm), aluminum hydroxide ($Al(OH)_3$) and lithium carbonate were mixed with each other, and then calcined at 960° C., thereby obtaining lithium manganate particles.

Comparative Examples 2, 4 and 5

The same procedure as defined in Example 1 was conducted except that the kind of manganese oxide used, the coating amount of aluminum, the amount of phosphorus added and the calcination conditions were changed variously, thereby obtaining lithium manganate particles.

The production conditions used above are shown in Table 1, and various properties of the thus obtained lithium manganate particles are shown in Table 2.

The lithium manganate particles obtained in Comparative Example 2 were subjected to EPMA mapping of Mn and Al on a section of the respective particles in the same manner as in Example 1. As a result, it was confirmed that Al was localized on the surface of the respective particles, and was not uniformly present within the respective particles.

TABLE 1

| Examples and Comp. Examples | Precursor | | | |
|---|---|---|---|---|
| | Kind of Mn compound (—) | Average primary particle diameter (µm) | Coating element (—) | y (—) |
| Example 1 | $Mn_3O_4$ | 4 | Al | 0.10 |
| Example 2 | $Mn_3O_4$ | 4 | Al | 0.10 |
| Example 3 | $Mn_3O_4$ | 4 | Al | 0.10 |
| Example 4 | $Mn_3O_4$ | 4 | Al | 0.10 |
| Example 5 | $Mn_3O_4$ | 4 | Al | 0.10 |
| Comp. Example 1 | $MnO_2$ | 15 | — | — |
| Comp. Example 2 | $Mn_3O_4$ | 4 | Al | 0.10 |
| Comp. Example 3 | $Mn_3O_4$ | 4 | — | — |
| Comp. Example 4 | $Mn_3O_4$ | 4 | Al | 0.10 |
| Comp. Example 5 | $Mn_3O_4$ | 4 | Al | 0.10 |

| Examples and Comp. Examples | Mixing | | |
|---|---|---|---|
| | Amount of Li x (—) | Element in additives (—) | Particle diameter (µm) |
| Example 1 | 0.072 | P | — |
| Example 2 | 0.072 | P | — |
| Example 3 | 0.072 | P | — |
| Example 4 | 0.072 | P | — |
| Example 5 | 0.072 | P | — |
| Comp. Example 1 | 0.065 | Al | 0.5($Al(OH)_3$) |
| Comp. Example 2 | 0.072 | P | — |
| Comp. Example 3 | 0.065 | Al | 0.5($Al(OH)_3$) |
| Comp. Example 4 | 0.065 | — | — |
| Comp. Example 5 | 0.072 | P | — |

| Examples and Comp. Examples | Mixing | | Calcination conditions | |
|---|---|---|---|---|
| | y (—) | P (mol %) | Temperature in air (° C.) | Time (hr) |
| Example 1 | — | 0.20 | 960 | 3 |
| Example 2 | — | 0.10 | 960 | 3 |
| Example 3 | — | 0.05 | 960 | 3 |
| Example 4 | — | 0.20 | 860 | 3 |

TABLE 1-continued

| | | | | |
|---|---|---|---|---|
| Example 5 | — | 0.50 | 960 | 3 |
| Comp. Example 1 | 0.10 | — | 960 | 3 |
| Comp. Example 2 | — | 0.20 | 760 | 3 |
| Comp. Example 3 | 0.10 | — | 860 | 3 |
| Comp. Example 4 | — | — | 880 | 3 |
| Comp. Example 5 | — | 0.70 | 960 | 3 |

TABLE 2

| Examples and Comp. Examples | Properties of lithium manganate particles | |
|---|---|---|
| | Composition | P/Mn (mol %) |
| Example 1 | $Li_{1.072}Mn_{1.828}Al_{0.1}O_4 + 0.0037P$ | 0.20 |
| Example 2 | $Li_{1.072}Mn_{1.828}Al_{0.1}O_4 + 0.0019P$ | 0.10 |
| Example 3 | $Li_{1.072}Mn_{1.828}Al_{0.1}O_4 + 0.00092P$ | 0.050 |
| Example 4 | $Li_{1.072}Mn_{1.828}Al_{0.1}O_4 + 0.0019P$ | 0.10 |
| Example 5 | $Li_{1.072}Mn_{1.828}Al_{0.1}O_4 + 0.0092P$ | 0.50 |
| Comp. Example 1 | $Li_{1.065}Mn_{1.835}Al_{0.1}O_4$ | 0.0 |
| Comp. Example 2 | $Li_{1.072}Mn_{1.828}Al_{0.1}O_4 + 0.0037P$ | 0.20 |
| Comp. Example 3 | $Li_{1.065}Mn_{1.835}Al_{0.1}O_4$ | 0.0 |
| Comp. Example 4 | $Li_{1.065}Mn_{1.835}Al_{0.1}O_4$ | 0.0 |
| Comp. Example 5 | $Li_{1.072}Mn_{1.828}Al_{0.1}O_4 + 0.0129P$ | 0.70 |

| Examples and Comp. Examples | Properties of lithium manganate particles | | |
|---|---|---|---|
| | Average primary particle diameter (μm) | Average secondary particle diameter (μm) | BET ($m^2/g$) |
| Example 1 | 5.0 | 5.9 | 0.69 |
| Example 2 | 5.0 | 6.1 | 0.68 |
| Example 3 | 5.0 | 5.7 | 0.70 |
| Example 4 | 5.0 | 6.7 | 0.69 |
| Example 5 | 5.0 | 6.2 | 0.69 |
| Comp. Example 1 | 15.0 | 18.3 | 0.67 |
| Comp. Example 2 | 5.0 | 5.7 | 1.14 |
| Comp. Example 3 | 4.0 | 6.7 | 0.65 |
| Comp. Example 4 | 4.0 | 6.5 | 0.75 |
| Comp. Example 5 | 5.0 | 6.5 | 0.67 |

| Examples and Comp. Examples | Properties of lithium manganate particles | | | Output chara. | Storage chara. |
|---|---|---|---|---|---|
| | Lattice constant (nm) | Intensity ratio I(400) (%) | Intensity ratio I(440) (%) | Capacity 0.1C (mAh/g) | Rcv (%) |
| Example 1 | 0.8199 | 33 | 18 | 106 | 98 |
| Example 2 | 0.8199 | 34 | 17 | 108 | 98 |
| Example 3 | 0.8197 | 30 | 16 | 108 | 98 |
| Example 4 | 0.8199 | 33 | 18 | 106 | 98 |
| Example 5 | 0.8203 | 32 | 18 | 108 | 97 |
| Comp. Example 1 | 0.8203 | 32 | 15 | 107 | 89 |
| Comp. Example 2 | 0.8202 | 25 | 13 | 91 | 68 |
| Comp. Example 3 | 0.8197 | 41 | 22 | 107 | 93 |
| Comp. Example 4 | 0.8200 | 35 | 20 | 106 | 88 |
| Comp. Example 5 | 0.8204 | 36 | 22 | 88 | 82 |

INDUSTRIAL APPLICABILITY

The lithium manganate particles according to the present invention are capable of providing a secondary battery having a high output and an excellent high-temperature stability when used as a positive electrode active substance of the battery. Therefore, the lithium manganate particles according to the present invention are suitable as a positive electrode active substance for a secondary battery.

The invention claimed is:

1. Lithium manganate particles having a primary particle diameter of 1 to 8 μm and forming single-phase particles, which have a composition represented by the following chemical formula:

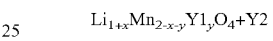

$Li_{1+x}Mn_{2-x-y}Y1_yO_4+Y2$ in which Y1 is at least one element selected from the group consisting of Ni, Co, Mg, Fe, Al, Cr and Ti; Y2 is P and is present in an amount of 0.01 to 0.6 mol % based on Mn; and x and y satisfy $0.03 \leq x \leq 0.15$ and $0.05 \leq y \leq 0.20$, respectively, and which lithium manganate particles have a specific surface area of the lithium manganate particles of 0.3 to 0.9 $m^2/g$ as measured by a BET method; and an average particle diameter ($D_{50}$) of the lithium manganate particles of 3 to 10 μm.

2. Lithium manganate particles according to claim 1, wherein an X-ray diffraction intensity ratio of I(400)/I(111) of the lithium manganate particles is 30 to 50%, and an X-ray diffraction intensity ratio of I(440)/I(111) of the lithium manganate particles 15 to 25%.

3. Lithium manganate particles according to claim 1, wherein when a non-aqueous secondary electrolyte CR 2032 battery comprising the lithium manganate particles are used as a whole or a part of a positive electrode active substance, a non-aqueous electrolyte solution comprising EC and DEC at a mixing ratio of 3:7 to which $LiPF_6$ is added in an amount of 1 mol/L, and a 500 μm-thick Li foil are used as a negative electrode, are used as a battery and the battery is subjected to measurement of charge/discharge capacities, an initial discharge capacity of the battery is 90 to 115 mAh/g.

4. Lithium manganate particles according to claim 1, wherein when a non-aqueous electrolyte secondary CR 203 battery comprising the lithium manganate particles which are used as a whole or a part of a positive electrode active substance, a non-aqueous electrolyte solution comprising EC and DEC at a mixing ratio of 3:7 to which $LiPF_6$ is added in an amount of 1 mol/L, and a 500 μm-thick Li foil as a negative electrode, are used as a battery and the battery is subjected to measurement of charge/discharge capacities in which the battery is charged and discharged at a rate of 0.1 C to measure a discharge capacity (a) thereof, charged at a rate of 0.1 C until reaching 4.5 V and discharged until reaching a discharge depth of 70%, then allowed to stand at 60° C. for one week, again discharged until reaching 3.0 V, and then again subjected to a charge/discharge test for one cycle at a rate of 0.1 C to measure a discharge capacity (b) thereof, a capacity recovery rate (b/a (%)) of the battery is not less than 95%.

5. A process for producing the lithium manganate particles as defined in claim 1, comprising the steps of:
   mixing lithium carbonate, manganese oxide coated with a compound of at least one element selected from the group consisting of Ni, Co, Mg, Fe, Al, Cr and Ti, and a phosphorus compound having a melting point of not higher than 800° C. with each other; and
   calcining the resulting mixture at a temperature of 800 to 1050° C.

6. A process for producing the lithium manganate particles according to claim 5, wherein the manganese oxide coated with the compound of at least one element selected from the group consisting of Ni, Co, Mg, Fe, Al, Cr and Ti is obtained by adding an aqueous solution comprising a salt of at least one element selected from the group consisting of Ni, Co, Mg, Fe, Al, Cr and Ti to a water suspension comprising manganese oxide to adjust a pH value of the water suspension and thereby form a coat of the compound of at least one element selected from the group consisting of Ni, Co, Mg, Fe, Al, Cr and Ti on a surface of respective particles of the manganese oxide.

7. A process for producing the lithium manganate particles according to claim 6, wherein the coat of the compound of at least one element selected from the group consisting of Ni, Co, Mg, Fe, Al, Cr and Ti which is formed on the surface of respective particles of the manganese oxide is non-crystalline as analyzed by X-ray diffraction.

8. A process for producing the lithium manganate particles according to claim 6, wherein the manganese oxide is in the form of a single crystal.

9. A process for producing the lithium manganate particles according to claim 5, wherein the manganese oxide has an average particle diameter of not less than 1 μm.

* * * * *